Figure 2:
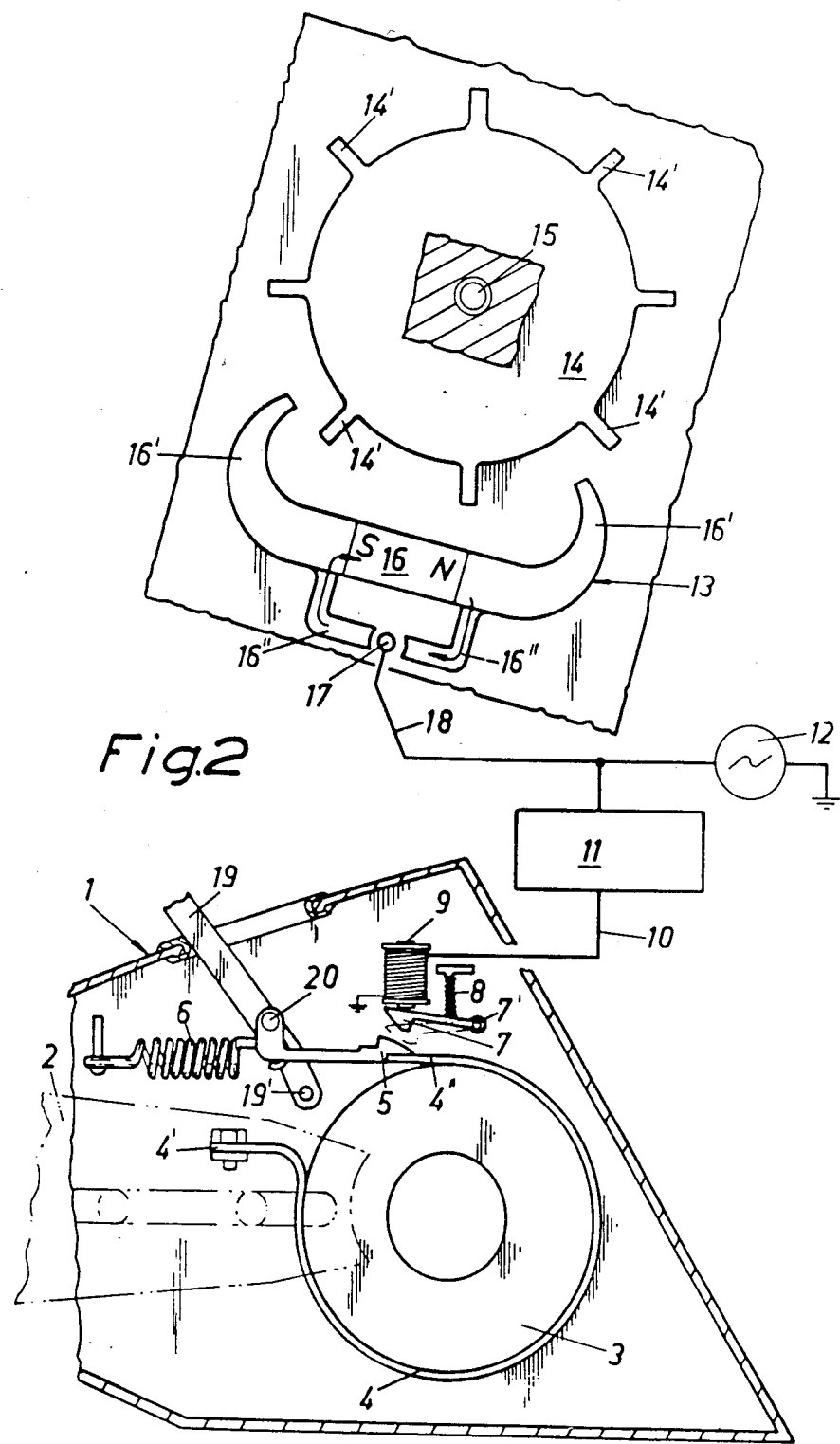

United States Patent [19]

Andreasson

[11] Patent Number: 4,573,556
[45] Date of Patent: Mar. 4, 1986

[54] ACTUATOR FOR THE RELEASE OF AN AUTOMATIC EMERGENCY BRAKE OF A HAND-OPERATED POWERED TOOL

[75] Inventor: Bo C. Andreasson, Gothenburg, Sweden

[73] Assignee: Aktiebolaget Electrolux, Stockholm, Sweden

[21] Appl. No.: 599,730

[22] Filed: Apr. 12, 1984

[30] Foreign Application Priority Data

May 20, 1983 [SE] Sweden .................... 8302885

[51] Int. Cl.$^4$ .................. F16D 59/02; B27B 17/02
[52] U.S. Cl. ........................ 188/137; 30/382
[58] Field of Search .................. 192/1, 2, 3 M, 0.082, 192/17 C, 8 R, 129 A, 144, 103 C; 188/77 R, 135, 137; 30/381, 382, 383

[56] References Cited

U.S. PATENT DOCUMENTS

| | | | |
|---|---|---|---|
| 3,664,390 | 5/1972 | Mattsson et al. | 30/380 X |
| 3,785,465 | 1/1974 | Johansson | 192/17 C X |
| 3,839,795 | 10/1974 | Dooley | 192/103 C X |
| 4,152,833 | 5/1979 | Phillips | 30/382 |
| 4,335,514 | 6/1982 | Overy et al. | 192/3 M X |
| 4,402,138 | 9/1983 | Glockle et al. | 30/382 |

Primary Examiner—Tony M. Argenbright
Attorney, Agent, or Firm—Alfred E. Miller

[57] ABSTRACT

Actuator for the release of automatic emergency brakes of hand-operated, powered tools, such as chain saws, having a driving shaft for the tool. Such emergency brakes are constituted of a brake mechanism released by means of stored energy. The actuator is constituted of a rotatable and balanced body with a small amount of friction on a shaft situated essentially parallel to the driving shaft. The actuator is fabricated of a permeable material, and has a mass having an essential inertia against rotation on the shaft. The actuator cooperates firstly with a magnet retaining the actuator with a predetermined magnetic force against rotation in an angular position of the actuator, and then with a sensor which is so arranged that an impulse for releasing the brake mechanism is given as soon as the actuator comes out of said angular position.

5 Claims, 7 Drawing Figures

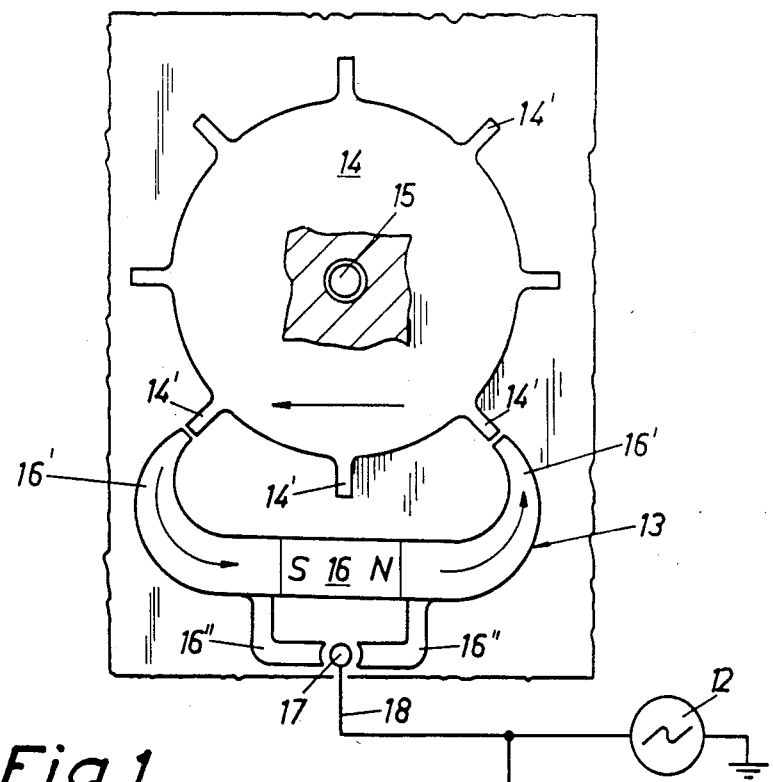
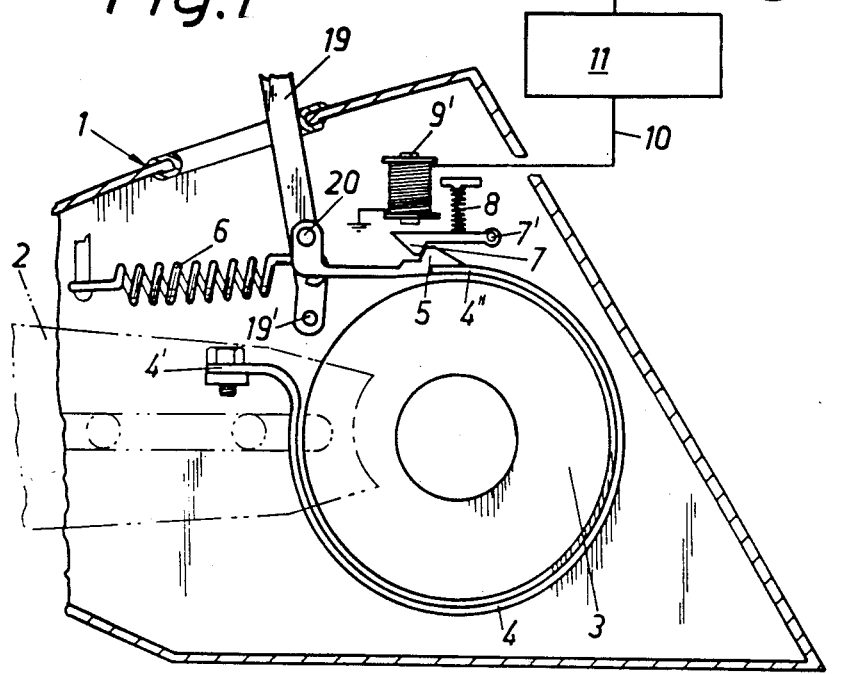
Fig.1

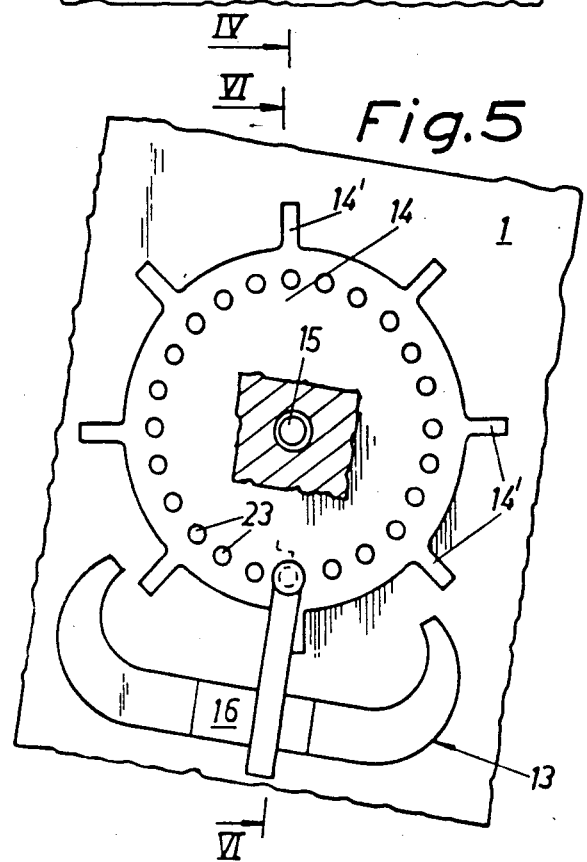
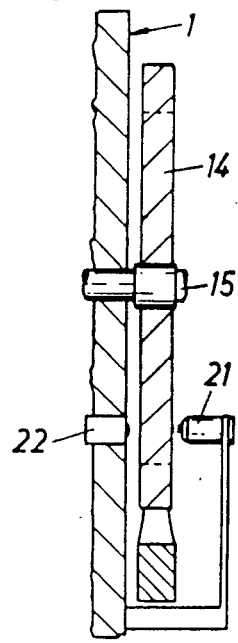
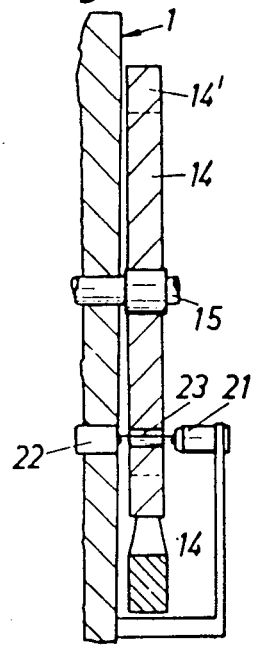

ACTUATOR FOR THE RELEASE OF AN AUTOMATIC EMERGENCY BRAKE OF A HAND-OPERATED POWERED TOOL

The present invention relates to an actuator for the release of automatic emergency brakes of hand-operated, powered tools with a rotating driving shaft as, for instance, powered chain saws, in which the emergency brake at the driving shaft is constituted of a brake mechanism releasable by means of stored energy.

Power chain saws are tools which, unfortunately, under certain circumstances, can bring about severe injuries to the saw operator, or persons in proximity to him. The risk of accident is greatest during debranching procedures. It may occur that the saw chain on the upper edge of the blade travelling out from the saw body jams in branches at the top of the blade and is momentarily stopped. This momentary stoppage of the saw chain is forwarded by means of the saw links to the driving shaft of the chain where an essential torque arises. The torque can, by the momentary stoppage of the chain, bring about a speedy rotary motion of the motor saw, a so-called kick-back, upwards around a fulcrum resulting from the throw- and inertia forces. It is very difficult for a saw operator to inhibit a kick-back that has already began, as a motor saw is carried by handles positioned near to or immediately above the center of gravity of the saw.

Several emergency brakes are known which are adapted to be released by a kick-back and thereby brakes the chain sprocket, whereby the torque is nullified and the injury risk to be injured by the chain, if the saw kicks back against the operator is decreased.

These emergency brakes are usually provided with a band brake extended around a clutch drum provided with a sprocket, and by means of a centrifugal clutch is connected to the driving shaft of the chain saw engine. The band brake is provided with a locking mechanism, in the locking position of which the brake is disengaged against the action of a spring member. When the locking mechanism is released, the spring member sets the band brake into contact with the clutch drum, and possibly the engine ignition is switched off at the same time.

In connection with the foregoing it has been difficult to develop an actuator for the release of the locking mechanism having a sufficient speed of reaction while not risking to be subjected to tearing, pollution, corrosion or the vibrations and shocks, which usually occur with the use of chain saws.

The locking mechanism is, for instance, released by a kick-back in the following manners:

A. the operator's hand strikes a stirrup mechanically connected to the locking mechanism, when the saw body swings around the fulcrum, B. the stirrup releases the lock mechanically by its inherent inertia without any contact with the operator, C. a predetermined relative movement between the saw body and the saw blade makes the desired release through a link connection between these two parts, D. an electrical switch on the stirrup releases the lock by making contact, E. an electrical switch subjected to inertia forces releases the lock directly without actuation of any stirrup being necessary to the kick-back, or F. an onver-pressure valve of a pressure chamber co-acting with a pressure sprng connected to the brake is subjected to inertia forces and releases the lock.

All these solutions have one or more drawbacks. A mechanical device according to A, B and C with different degrees of reaction is sensible to tearing by vibrations, pollution and corrosion. Moreover, the reaction time is often not short enough which is also the matter of case D. It must be possible to interrupt a usual kick-back within a tenth of a second in order that the operator shall not be struck by a rotating chain. The solution accordng to E or F often causes so-called stall for the reason that the handles of modern motor saws are resilient mounted which may cause swing movements of the saw body releasing the lock, if the resilient elements are torn or have not the correct resilience owing to cold whether. An example of the principle of design according to E is shown in DE-OS No. 3,018,952 and according to F in U.S. Pat. No. 3,974,566.

The purpose of the invention is to construct an actuator for the locking mechanism in known band brakes of hand-operated, powered tools, such as motor saws, which actuator can be made resistant to usual vibrations and shocks, be positioned in a protective location in the motor saw, and be given a very short reaction time on a kick-back.

This shall be achieved in accordance with the invention in the way and by the means defined in the following claims.

The invention will be explained hereinafter in connection with a couple of embodiments which are shown in the accompanying drawings, where FIG. 1 is a schematic view showing a saw body in a side elevational view with a detached actuator, according to an embodiment of the invention shown in enlargement FIG. 2 is a corresponding view showing the actuator after a kick-back.

FIG. 3 is a schematic view showing an actuator according to a second embodiment of the invention FIG. 4 is a cross section along the line IV—IV in FIG. 3.

Figure 7:
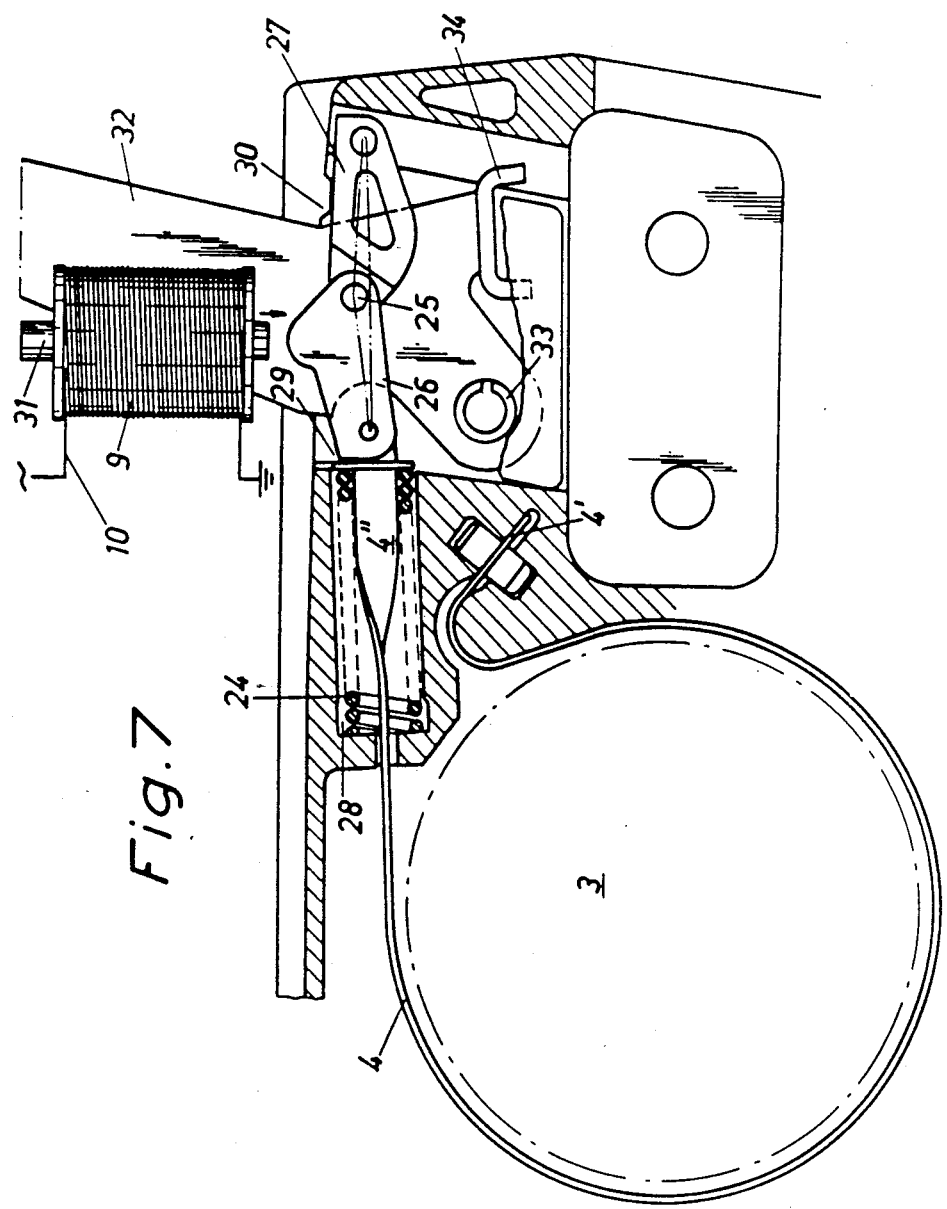

FIGS. 5 and 6 correspond to FIGS. 3 and 4, respectively, but show the actuator after a kick-back, and FIG. 7 is a schematic view showing an alternative embodiment of the brake mechanism in side elevation.

In FIG. 1 a chain saw powered by an internal combustion engine is partly shown in a side view with a saw body 1 and a therefrom projecting saw sword 2 for a saw chain, which is not shown. The saw chain is tensioned around a sprocket secured to a clutch drum 3 which, by means a centrifugal clutch, is in driving engagement with the crank shaft of a driving engine, which is not shown.

In the saw body a brake mechanism known per se is disposed and constituted of a band 4 extended around the clutch drum 3. One end 4' of the band 4 is secured to the saw body 1 and the other end 4" to one end of a hook member 5, the other end of which is connected to a spring member 6. This is tensioned to the saw body 1 and functions to set the brake band 4 into contact with the drum 3.

The hook member 5 is in engagement with a pawl 7 (FIG. 1) which is pivoted on a shaft 7' and set against another spring member 8 which biases the pawl in the counter-clockwise direction (FIGS. 1 and 2). The force of the spring member 8 on the pawl 7 can be overcome by an electromagnet 9 positioned in the saw body above the pawl. This magnet is connected by wires 10 to an electric unit 11 which, on one hand, is connected to a power source 12 in the saw body 1 and, on the other, to a sensor unit 13 for the detection of a kick-back.

The sensor unit includes an actuator 14 which is journalled with a small friction resistance on a shaft 15 in a separate, preferably hermetically sealed enclosure in the saw body 1. The actuator 14 is in the shape of a wheel and is made of a permeable material with radially projecting teeth 14' which are evenly distributed around the periphery of the actuator. It is balanced thus and cannot be rotated by vibrations or shocks on the saw body 1. However, it has an inherent inertia which offers a resistance against rotation, and also when the saw body is subjected to twisting strain around a fulcrum parallel to the shaft 15. As hereinafter described, the kick-back generates a swinging motion of the saw. The actuator 14 is positioed in a protective location in the saw body 1 with the shaft 15 parallel to this fulcrum.

Below the actuator there is a permanent magnet 16 having extended, curved pole ends 16' directed up to the actuator. In some of the angular positions of the actuator 14 a couple of the projecting teeth 14' are positioned just in front of their respective magnetic pole end 16' (FIG. 1).

At each magnetic pole there is a down- and inward directed arm 16' and these arms form an interspace which is essentially broader than the gaps separating the pole ends 16' of the permanent magnet 16 and the adjacent teeth 14' of the actuator 14. In this broader interspace a Hall-generator 17 is positioned and by wires 18 connected to the electronic unit 11 and the power source 12.

When the actuator is positioned in a normal position (FIG. 1) a magnetic flux is maintained from one pole of the permanent magnet 16 as the arrows shown in FIG. 1, through the gap at the tooth 14' through the actuator to the next tooth 14' and the corresponding gap to the other magnetic pole. The actuator 14 is maintained in its position by the magnetic flux having a predetermined strength. When this strength is exceeded by a kick-back, as FIG. 2 shows, the saw body 1 is momentarily swung a little in relation to the actuator 14. The gaps between the actuator 14 and the pole ends 16' of the permanent magnet 16 are essentially increased. The magnetic flux through the actuator 14 is thereby interrupted and deflected through one of the arms 16" down through the Hall-generator 17, as the arrows in FIG. 2 show, and back through the other arm 16". The magnetic flux through the Hall-generator 17 starts a signal through the wire 18 to the electronic unit 11 which actuates the magnet 9 through the wire 10. The ignition circuit can possibly be broken at the same time. The pawl 7 is thereby disengaged from the hook member 5, and the brake band 4 tensioned around the drum 3 by the spring 6 so that the drum 3 is stopped. This procedure is carried out within a split second.

After the kick-back, the actuator 14 is attracted by the magnet flux and reset into the first position, whereby the current to the actuated magnet 9 is broken by switching in the electronic unit 11 through the Hall-generator 17. Then the pawl 7 re-occupies its working position to keep the brake mechanism in readiness. The locking mechanism can now be reset into the normal position shown in FIG. 1 by means of an operating arm 19 which may be constituted of a protective stirrup, that is known per se. The operation arm 19 is pivoted on a shaft 19' in the saw body 1 and connected through a joint 20 to the hook member 5.

If a kick-back is eliminated by the emergency brake in the way that the ignition of the engine has been broken, and the clutch drum 3 has been stopped, the actuator 14 will automatically be attracted by the magnetic flux and reset into the ready position. Then the ignition circuit system is reset. However, before the engine can get started, the operating arm 19 must be moved into working position. The pawl 7 is biased downwardly by the action of the spring 8 already whne the engine stopped by the release of the mechanism, as the current supply to the magnet 9 from the supply system of the engine ceased. The locking mechanism can thus be actuated as soon as the engine has stopped, but the short circuit of the ignition system by means of the electronic unit 11 remains, until the actuator 14 occupies its ready position in the magnetic field.

FIGS. 3–6 shown an actuator 14 according to another embodiment of the invention. The permanent magnet 16 is not provided with arms and the Hall-generator is replaced by an optical sensor constituted of an LED 21 and a light sensible photo-transistor 22 which components are positioned on either side of the actuator 14. The light beam of the LED 21 is normally broken by the actuator 14 when it is positioned with a couple of teeth 14' in the magnetic field, as shown in FIG. 3. By the generation of a kick-back the saw body 1 is swung in relation to the actuator 14, and one or more of the apertures 23 provided therein will let the light beam from the LED 21 through to the photo-transistor 22. Consequently a signal to the electronic unit 11 commences which releases the pawl 7 through the magnet 9.

The actuator 14, according to the invention, makes it possible to produce a speedy reaction and reliable release of an emergency brake in an inexpensive and simple way. The sensitivity of the actuator can easily be adjusted to the strength of the magnetic field or the gaps between the magnet 16 and the actuator 14. The design of the actuator makes it totally insensitive to vibrations and the usual direct shocks on the saw body.

FIG. 7 shows an alternative embodiment of a brake mechanism. The brake band 4 is at one end 4' secured to the saw body 1, and encircles the clutch drum 3, and passes through a compression spring 24 and is at the other end 4" swingably connected to one end of a knee-joint latch. This assembly constitutes two joint members 26, 27 forming a joint 25. The other end of the knee-joint latch is swingably attached to the new body 1. The compression spring 24 is tensioned in a hole 28 in the saw body and is supported at one end by a wall therein and at the other against a washer 29 with a slot. The end of the joint member 26 is supporting the washer.

The action of the spring 24 is directed to the knee-joint latch through the washer 29 and functions to force the band end 4" in direction to the right in FIG. 7. However, the joint members 26 and 27 lock it in the shown position as the common joint 25 is somewhat above the extended central axis of the spring which coincide with a fictitious line between the fixing points of the knee-joint latch at the band end 4" and at the saw body 1, respectively.

In this position the one joint member 27 abuts a nose 30 on the saw body 1. The solenoid 9' is positioned in the saw body above the joint member 26 in the vicinity of the joint 25. An axially movable core 31 is provided in the solenoid 9', and adapted to move downward to the joint member 26 by the excitation of the solenoid, and to strike this member at a point below the extended central axis of the spring. It is then possible for the spring 24 to act in manner in the way that the knee-joint mechanism will yield downwards and the band 4 will be tensioned around the clutch drum 3.

The knee-joint mechanism is swingable upwards to the locking position by means of a protective stirrup 32 which is swingable around a pivot 33 in the saw body 1 and provided with a dog 34 adapted to act on the joint member 27 when making a counter-clockwise motion in FIG. 7. After this reset of the locking mechanism the protective stirrup 32 is moved clockwise back to the position shown in FIG. 7.

It is not intended to restrict the present invention to above described embodiments, but it should be apparent that it can be utilized in other hand-operated tools with rotating members which by stoppage can bring about injurious torque movements. For example, the actuator 14 can be provided with one or more magnetic members which in any angular position act on a permeable portion in the saw housing. The optical sensor unit according to FIGS. 3-5 can also be otherwise designed, for instance, by means of a combined light emitting-light sensing unit which cooperates with reflecting portions of the actuator 14.

I claim:

1. An actuator for the release of an automatic emergency brake for hand-operated, powered tools, having a driving shaft for the tool in which the emergency brake is constituted of a brake mechanism at the driving shaft that is releasable by means of stored energy, comprising: a magnet, a sensor, an actuator that is a rotatable balanced body with a small amount of friction on a shaft situated essentially parallel to said driving shaft and made of a permeable material having a mass presenting an essential inertia against rotation around the shaft, and wherein the actuator cooperates with said magnet retaining the actuator with a predetermined magnetic force against rotation in an angular position of the actuator, and then with said sensor which is so adapted that an impulse for releasing the brake mechanism is given as soon as the actuator moves from said angular position.

2. An actuator as claimed in claim 1, wherein said magnet is provided with two pole ends directed to the actuator and with an arm projecting from each one of them, a sensor, said arms forming an interspace in which the sensor is located, and in that the actuator is provided with at least two teeth, which in an angular position of the actuator together with corresponding pole ends forms a gap which is smaller than the interspace between the arms, and through which the magnetic flux passes in said angular position, but in another angular position forms a spacing between the actuator and the pole ends which is greater than said interspace between the arms through which the magnetic flux then will pass and cause the sensor to generate the impulse for releasing the brake mechanism.

3. An actuator as claimed in claim 1, further comprising a light emitting means and a light sensitive means, said light emitting means being adapted to direct a light beam to the actuator which is adapted to connect the light beam to said light sensitive means when the actuator moves out of said angular position, whereby the light sensitive means generates said impulse for releasing the brake mechanism.

4. An actuator as claimed in claim 3, wherein said light emitting means is adapted to direct a light beam to a light sensitive means which is adapted to generate said impulse for releasing the brake mechanism when the actuator interrupts the light beam.

5. An actuator as claimed in claim 1, wherein it is adapted to break the ignition current to the driving engine simultaneously with the release of the brake mechanism.

* * * * *